United States Patent Office 2,772,596
Patented Dec. 4, 1956

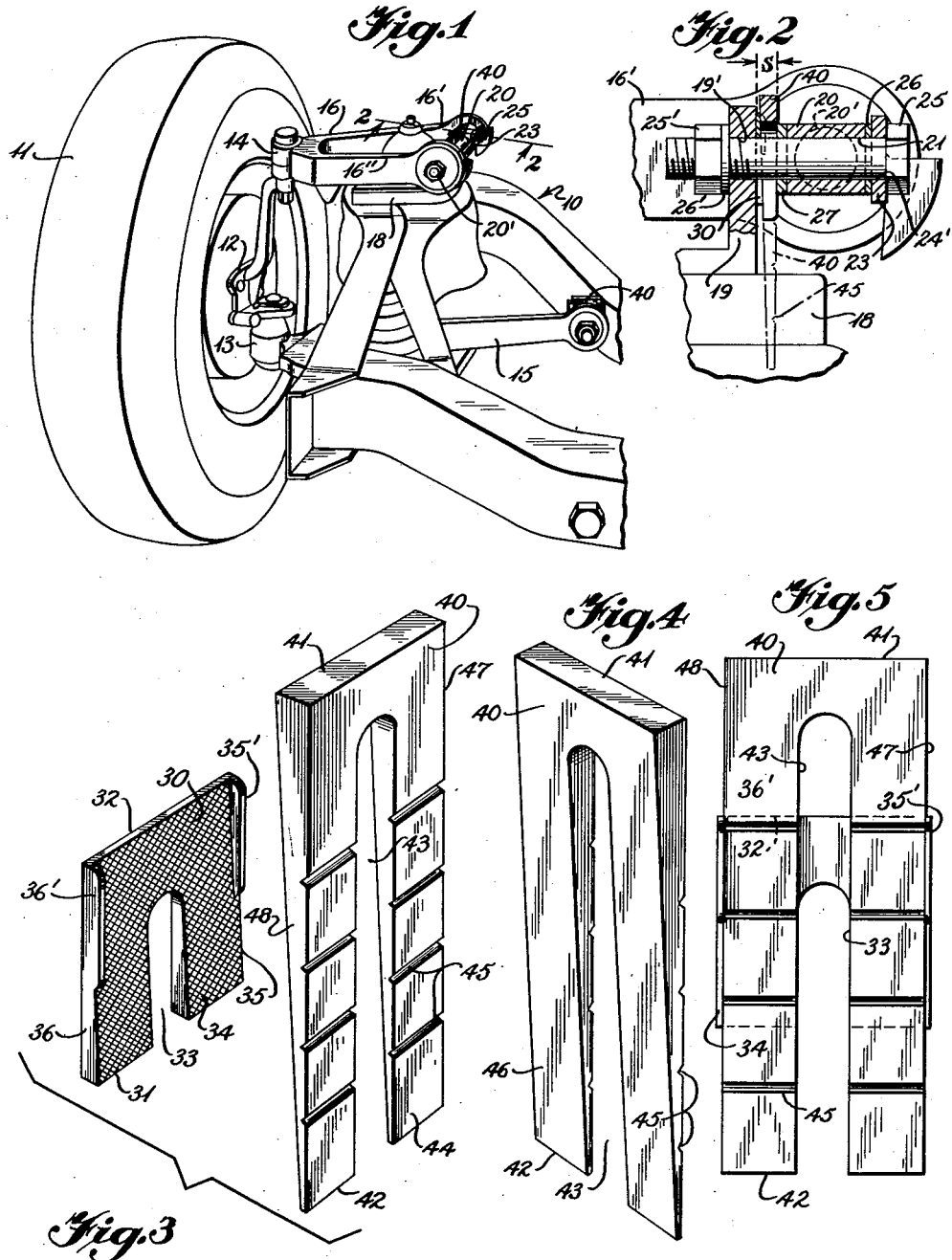

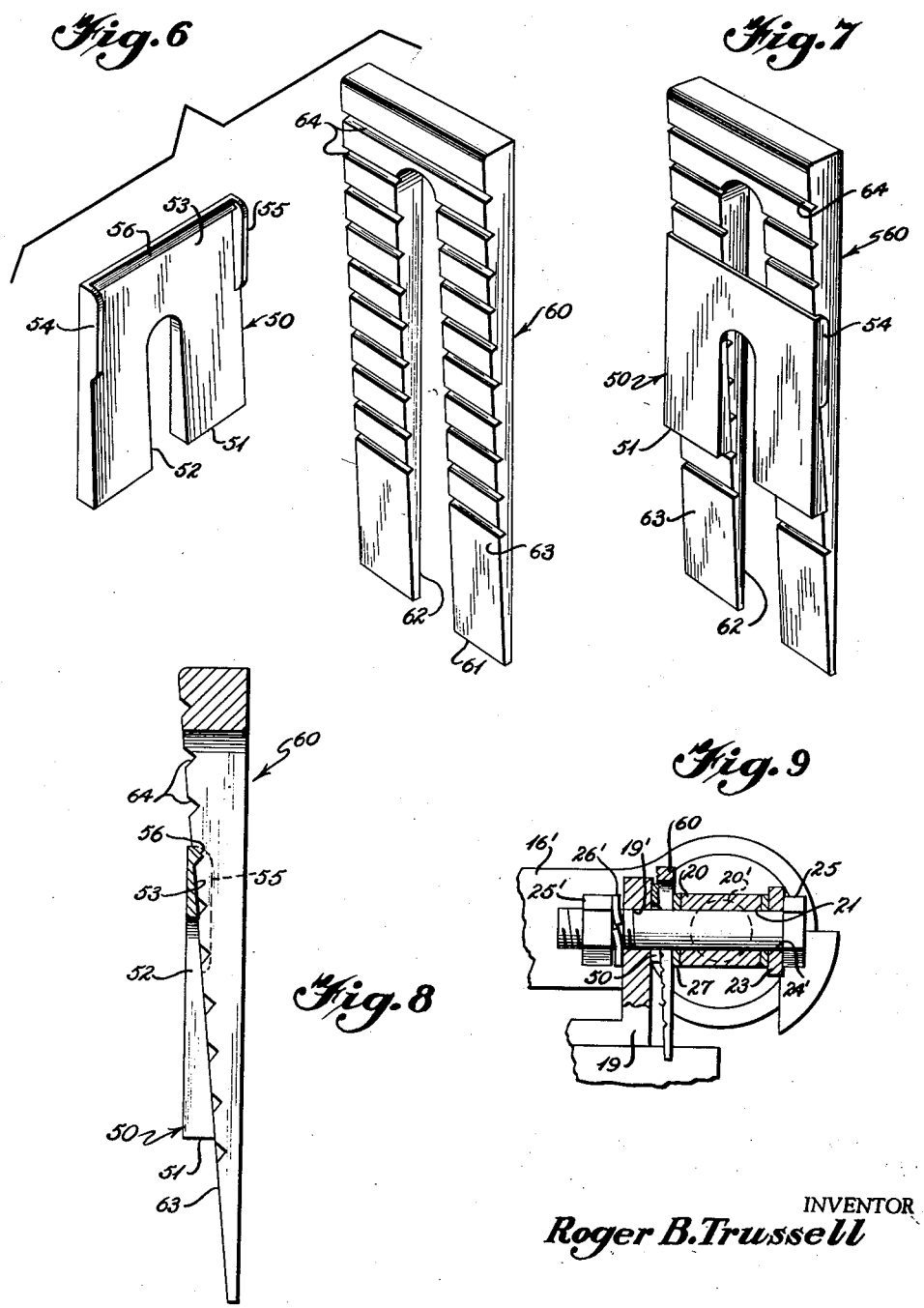

2,772,596

COMBINATION PAIR OF ADJUSTABLE SHIMS FOR AUTOMOBILE CAMBER AND CASTER CONTROL

Roger B. Trussell, Richmond, Va.

Application December 7, 1954, Serial No. 473,533

3 Claims. (Cl. 85—50)

My invention is directed to an adjustable thickness of shim for automobile camber and caster control. This application is a continuation-in-part of my copending application, Serial No. 424,228, filed April 19, 1954 and later abandoned.

On certain types of automobile running gear the camber and caster of the front wheels are in final adjustment accomplished by use of shims placed between a fixed part of the frame of the vehicle and an adjustably positionable front wheel supporting structure. By placing in a certain number of shims, by trial and error, the proper thickness is built up for the spacing at generally two spaced apart points of adjustment. The bolts passing through the shims and holding the adjustable part in engagement with the fixed part of the vehicle body through the shims are then tightened and a check is made of the camber and caster obtainer. By this trial and error method of placing or removing additional small thickness shims the correct camber and caster setting is obtained.

This method of camber and caster adjustment by adding or removing small increments of shims is a tedious and needless to say time-consuming operation.

It is an object of my invention to provide a pair of wedge shaped cooperating shims with one being stationary in position and the other adjustable thereagainst so as to afford a wide range of spacing for camber and caster adjustment in an automobile front end running gear.

A further object of my invention is to provide a pair of wedge shaped shims with one being stationary and having protruding stop means on its slanting face for cooperation with spaced apart recesses in the cooperating slanting face of the other shim so as to position the second shim in a definite position against the first shim, both shim members being slotted for a part of their length so as to be received over a clamping bolt extending normal to the cooperating shims.

Yet a further object of my invention is to provide a pair of wedge shaped shims with the first being stationary and having a protruding ridge across the slanting face thereof for cooperation with spaced apart grooves extending across and into the cooperating face of a second shim member, the grooves receiving the ridge so as to position one shim with respect to the other shim and the grooves in the over-hanging portion of the second shim over the first shim serving as weakened portions for breaking off a part of the second shim, both shims being slotted for a part of their length so as to be received over a clamping bolt for the shims which bolt extends normal to the shims.

Another object of my invention is to provide a pair of cooperating shims such that one may be moved with respect to the other and a protruding unutilized portion of the movable shim may be easily removed by striking a blow thereagainst.

Another object of my invention is to provide relative minute knurlings such as criss-cross file-like indentations on one of the cooperating abutting faces of the adjustable shims so as to provide a resistance to sliding engagement of one shim with the other.

A still further object of my invention is to provide on one of the cooperating shims guide elements for holding one shim in a longitudinal attitude with respect to the other shim member.

Another object of my invention is to provide each shim of a pair of cooperating reversely wedge-shaped elongated shims with an elongated open end slot whereby the shims may be slipped over an anchor bolt extending generally transversely to the elongated direction of the shims.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

Throughout the various figures and the specification like reference numerals refer to similar parts.

Fig. 1 is a perspective view of a typical automobile front end suspension which uses shims for camber and caster adjustment;

Fig. 2 is a sectional view along line 2—2 of Fig. 1 showing the use of the pair of shims according to my invention;

Fig. 3 is an exploded perspective view of the pair of cooperating adjustable shims;

Fig. 4 is a perspective view of the movable shim;

Fig. 5 is a view looking at the shims in Fig. 3 assembled in one selected position;

Fig. 6 is an exploded perspective view of each of the cooperating shims of a modified form;

Fig. 7 is a perspective view of the shims in Fig. 6 assembled;

Fig. 8 is a vertical cross sectional view taken through the longitudinal center of Fig. 7; and Fig. 9 is partial cross sectional view of the shims of Fig. 8 mounted in an automobile front end assembly similar to Figures 1 and 2.

In Fig. 1 a partial front end 10 of an automobile is illustrated which uses shims for adjusting camber and caster. Front wheel 11 is supported on a spindle and the support 12 which is supported through the lower ball joint 13 and the upper ball joint 14. Ball joint 13 is supported on the lower forked support 15 while the upper forked support 16 at its outer end forms a suitable bearing for the upper ball joint 14. A portion of the frame indicated at 18 supports the angle bracket 19, see Fig. 2, which in turn supports the mounting member 20 which extends generally lengthwise of the vehicle. Member 20 is provided with pivot pins 20' at each end which pivotally support the rear ends of the bifurcations 16' and 16" of the upper forked support 16. Member 20 also has a pair of transversely spaced apertures 21, the rear one only being shown in Fig. 2. Extending parallel to member 20 is a secondary support bar 23 which is spaced therefrom by washers 26 and has transverse apertures 24' therein which are in alignment with apertures 21 in member 20. Anchor bolts 25 extend through the apertures 24' in member 20 and aperture 19' in angle support 19. A lockwasher 26' may be placed over the bolt 25 before the nut 25' is applied.

Member 20 is provided with a transverse aperture 21 both at the front and at the rear thereof and these apertures are in appreciable spaced relationship. The adjustment of camber and caster is accomplished by placing shims of different thicknesses as indicated in the zone S in Fig. 2 between member 20 and support bracket 19. A suitable washer 27 may be positioned between the member 20 and the shim zone S.

Instead of using a number of small thickness shims to build up the desired shim zone spacing S at both the front and rear ends of member 20, I provide according to my invention, a pair of cooperating shim members 30 and 40. Thus, by loosening anchor bolt 25, see Fig. 2, the fixed position ship 30 is installed and then adjustably positionable shim 40 may be slid thereagainst to provide the correct spacing for zone S. By increasing the amount of thickness of zone S the camber of the wheel 11 is increased; that is, its top will be farther from the top of the opposite front wheel than its bottom is from the opposite wheel's bottom.

The caster of the mounting for wheel 11 may be adjusted by providing for a backward cant or inclination from the vehicle of the top forked support 16 with respect to the bottom forked support 15. This caster adjustment may be also obtained by decreasing the thickness of shim zone S at the rear with respect to the thickness of shim zone S at the front of mounting member 20.

According to my invention, the fixed position shim 30 is of a wedge shape being shown thicker at the bottom 31 than at its top 32. Shim 30 is formed with a slot 33 extending from the bottom edge 31 where it is open ended vertically through about half the height of the shim. This permits slipping of the shim down over the anchor bolt 25. The front face 34 of shim 30 is formed with a plurality of criss-cross file-like ridges of minute proportions to afford frictional resistance for positioning the adjustable shim member 40 thereagainst. On the sides 35 and 36 of shim 30 there is formed or affixed outwardly extending guides 35' and 36' which extend generally perpendicular to the plane containing the front face 34 of shim 30. These side guide elements 35' and 36' serve to retain adjustable shim 40 in face to face and longitudinal relationship to the fixed shim 30.

Referring now to the movable or adjustable positionable shim 40, it will be observed that this tapers in a reverse direction to that of shim 30 wherein the top end 41 is thicker than the lower end 42. As with the shim 30, there is provided a longitudinal open ended slot 43 extending from the bottom edge 42 where it is open throughout substantially the entire length of the shim which is about twice as long as it is wide. This slot 43 extends in the direction of the longitudinal center axis of shim 40 while slot 33 in shim 30 extends in a similar direction symmetrical with the longitudinal axis of shim 30. In the rear face 44 of shim 40, there is provided a plurality of spaced-apart transverse slots 45 which are V-shaped and extend into the rear face, the full width of the rear face of the shim. These slots provide breakage lines for snapping off that portion of the shim 40 which is not used after the proper adjustment is obtained. In other words, the lower portion of shim 40 shown in Fig. 2 which is in broken lines, would be removed. If the protruding portion did not interfere with other front end elements it could be left without being broken off or removed.

The side edges 47 and 48 of shim 40, as best illustrated in Fig. 5, are guided by the side guide elements 36' and 35' on fixed positioned shim 30.

In making the adjustment of camber and caster with the pair of shims according to my invention, it is merely necessary to unloosen the nut 25' and then move the adjustably positionable shim 40 with respect to the fixed position shim 30. In sliding the shim 40 some frictional resistance will be afforded to sliding movement by the criss-cross serrations 34 formed in the front face of shim 30. It is equally as feasible to form the front or abutting face 46, see Fig. 4, of the adjustable shim 40 with serrations while the face 34 of shim 30 could be left smooth. It is also within the scope of the invention to form both abutting faces with criss-cross serrations therein.

Figures 6-9 inclusive, show a modified form that the shims may take. A fixed positioned shim is indicated generally at 50 formed with its thicker end at the bottom 51 and having an elongated slot 52 extending in from the bottom end 51 for a little over half the length of the shim. Adjacent the upper and thinner end of shim 50, as indicated at 53, are side guide members 54 and 55 which extend outward from the face 53 at each edge. They extend from the top edge to adjacent the center of shim 50. Across the top of shim 50, at the upper face portion 53, is a protruding stop or male member 56 which is best shown in Fig. 8 as being of V-shaped cross section and extending out from the face portion 53.

The cooperating adjustably positionable shim is generally indicated at 60. It is of reverse wedge shape to that of shim 50. The bottom end 61 of shim 60 is the thinner end. From the bottom or thinner end 61 extends an elongated slot 62 which reaches nearly the full length of shim 60 so as to permit a maximum of adjustment of shim 60 with respect to shim 50 thereby providing a wide range of combined thickness adjustment by the cooperating shims. Into the slanting face 63 of shim 60 is formed a plurality of uniformly spaced apart transversely extending grooves 64 of V-shaped cross section, as shown in Fig. 8, to receive the protruding ridge 56 on shim 50.

The grooves 64 in adjustably positionable shim 60 are spaced apart in such manner that for each spacing a one-eighth degree angular change is obtained in the ultimate camber and caster adjustment in the front end suspension where these cooperating shims 50 and 60 are utilized according to my invention. Thus, referring to Fig. 9 wherein the same parts of the front end as described for Fig. 3 are shown, loosening up of nut 25' on securing bolt 25 permits lockwasher 26' to spring out so that tapping down on the top of shim 60, shown there assembled with shim 50, will move shim 60 down one space at a time affording one-eighth degree change in camber or caster adjustment depending upon which adjustment is being made. Shims 50 and 60 are held in tight but yieldable face to face engagement for adjustment after which nut 25' is set up on bolt 25 to hold the shims tightly in the set position. Should the necessity arise to decrease the spacing afforded between the work parts 19 and 20, shim 60, whose slot 62 is received over bolt 25, can be raised by merely inserting a pry bar at the top of the slot to pull shim 60 upward.

Shim 50 at its slot portion 52 is received over the transversely extending bolt 25. To assist in guiding shim 60 over the face 53 of shim 50, I form on shim 50 guide elements 54 and 55 as explained heretofore. It will be observed in Fig. 8 that the protrusion of guide elements 54 and 55 from the face 53 of shim 50 is just enough to form a barrier for the cooperating edges of shim 60 but not so thick as to extend beyond the back of shim 60 and interfere with the cooperative use of the two wedge shaped shim members.

A further feature of the modified shims 50 and 60 is with respect to the use of the grooves or notches 64 formed in the face 63 of shim 60. These grooves 64 form, particularly toward the thinner end of shim 60, weakened cross portions whereby a protruding unutilized portion of the shim may be broken off along such a groove portion. This is done, see Fig. 9, by striking the protruding lower portion of shim 60 a blow with a hammer.

The use of my pair of adjustable shims instead of inserting additional thin increments of shims, affords equal adjustment but in a more expeditious and time-saving manner. The position of the place where these shims are inserted or adjusted is not too accessible and any provision for making the adjustment of the spacing of member 20 with respect to bracket 19 easier is welcomed by the front end mechanic. By providing the side guide member 35' and 36' on the fixed shim element 30, shim 40 is easily positioned by being slipped into place with its slot 43 being received over anchor bolt 25. The same ease of installation applies for shims 50 and 60 plus the added features of uniform adjustment of shim 60 with respect to shim 50 through the ridge 56 and grooves 64 which in addition serve as a locking feature between the shims as well as the break off feature for shim 60.

In carrying out the invention, additional shims 40 or 60 of different wedge thicknesses may be employed with the fixed positioned shims 30 or 50 if the relatively wide range of adjustment provided by fixed shim 30 and movable shim 40 or fixed shim 50 and movable shim 60 are found insufficient.

On the fixed shims 30 and 50 each has respective guide elements 35'—36' and 54—55. These side guide elements as stated heretofore serve to align the movable cooperating shims. These guide elements also serve an additional function when the protruding legs of the shims 40 and 60 are struck a blow with a hammer to remove the unutilized portion and that is the prevention of the movable shim from rotating with respect to the fixed shim.

These cooperating pairs of shims are being used to replace the plurality of thin shims and the trial and error adding and removal of such thin shims in the front end running gear of automobiles. They have cut down the guess-work in front end wheel alignment and have materially reduced the time to carry out a front end wheel alignment.

I claim as my invention:

1. A pair of cooperating wedge-shaped elongated shim members of general rectangular shape, one of said shims being shorter and termed the fixed shim, said fixed shim having an elongated slot formed therein extending from its thicker end into the shim in the longitudinal direction and along the longitudinal axis to a position just beyond half the length of the shim, said slot being so positioned that it is received over an anchor bolt adapted to extend transversely through the shim so that about half the length of the shim lies each side of the anchor bolt and said fixed shim having guide elements extending along each side of the shim at the thinner end thereof, said other shim being an adjustably positioned shim with respect to the fixed shim and having an elongated slot extending therein from the thinner end along the longitudinal axis thereof for approximately the full length of the shim so as to also be received over the anchor bolt, said adjustably positioned shim being of a width to be easily receivable and guided between the guide members of the fixed shim, said elongated slots being in alignment when the adjustable shim is slid into position along the face of said fixed shim, at least one of said abutting faces of the cooperating shims being roughened so as to provide increased frictional resistance to one shim sliding over the other shim, said guide members on the fixed position shim being of such height that they do not extend above the surface of the adjustably positioned shim in an operative position and whereby movement of said adjustably positioned shim against said fixed position shim in a position where the thicker end of one shim is positioned proximal to the thinner end of the other shim so as to vary the combined thickness provided by the two wedge-shaped shims.

2. A pair of cooperating wedge-shaped shims according to claim 1 wherein said adjustably positioned shim has a plurality of spaced apart transversely extending grooves formed in the back face thereof whereby the portion of the adjustably positioned shim protruding beyond the fixed shim when in set position may be broken off along one of said transversely extending grooves, and wherein said guide members on the fixed position shim abut the adjacent edges of the adjustably positioned shim protruding beyond the fixed shim when in set position may be broken off along one of said transversely extending grooves and wherein said guide members on the fixed position shim abut the adjacent edges of the adjustably positioned shim and preventing the adjustably positioned shim from rotating with respect to the fixed position shim when the protruding portions of the adjustably positioned shim are removed along one of said grooves.

3. A pair of cooperating wedge-shaped shim members wherein one is a fixed position shim and the other is an adjustably positioned shim along the fixed positioned shim, said fixed position shim being an elongated member having an elongated slot extending from the thicker end into the shim in an elongated direction along its longitudinal axis to be slidably received over an anchor bolt extending transversely therethrough and having a rib extending outwardly from and transversely across the face thereof which abuts the other shim for cooperation with the other shim and guide elements extending along opposite elongated edges thereof between which is guided adjacent edges of the adjustably positioned shim, said adjustably positioned shim being approximately twice the length of said fixed positioned shim to provide a wide range of thickness adjustment of the two cooperating shims and having an elongated slot extending therein from an opposite end to that from which the elongated slot extends into the fixed position shim and in abutting relationship against said fixed position shim with the slots of both shims in alignment and received by the anchor bolt, a plurality of spaced apart grooves formed in the face and extending transversely thereacross for selective cooperation with said rib on the fixed position shim whereby uniform increase in combined thickness of the shims is accomplished by sliding the adjustable shim past the fixed shim and said shims are held in locked position, said transverse grooves serving also as weakened portions in the protruding unutilized portion of the adjustable shim whereby the unused portion may be removed by breaking it off along a groove line, said guide elements on the fixed position shim cooperating with the longitudinal adjacent edges of the adjustable shim to prevent it from rotating with respect to the fixed position shim, especially when the protruding ends of the adjustably positioned shim are struck a blow or snapped to break off the protruding end portion along one of said grooves.

References Cited in the file of this patent

UNITED STATES PATENTS

| | | |
|---|---|---|
| 187,838 | Frakes | Feb. 27, 1877 |
| 321,565 | Young | July 7, 1885 |
| 394,462 | Cook | Dec. 11, 1888 |
| 665,274 | Seaman | Jan. 1, 1901 |
| 910,712 | McCoy | Jan. 26, 1909 |
| 950,989 | Bowser | Mar. 1, 1910 |
| 1,452,777 | Band | Apr. 24, 1923 |
| 1,511,746 | Noll | Oct. 14, 1924 |
| 1,781,846 | Johnston | Nov. 18, 1930 |
| 2,624,386 | Russell | Jan. 6, 1953 |